United States Patent
Söderlund

(10) Patent No.: US 7,988,378 B2
(45) Date of Patent: Aug. 2, 2011

(54) FRICTION COUPLING

(75) Inventor: Jens Söderlund, Vadstena (SE)

(73) Assignee: ETP Transmission AB, Linkoping (SE)

( * ) Notice: Subject to any disclaimer, the term of this patent is extended or adjusted under 35 U.S.C. 154(b) by 720 days.

(21) Appl. No.: 11/991,853

(22) PCT Filed: Sep. 14, 2006

(86) PCT No.: PCT/SE2006/001048
§ 371 (c)(1),
(2), (4) Date: Jun. 12, 2008

(87) PCT Pub. No.: WO2007/032730
PCT Pub. Date: Mar. 22, 2007

(65) Prior Publication Data
US 2009/0114496 A1    May 7, 2009

(30) Foreign Application Priority Data

Sep. 16, 2005 (SE) ........................ 0502056

(51) Int. Cl.
*F16D 1/091* (2006.01)
*F16B 2/14* (2006.01)
*F16B 3/06* (2006.01)

(52) U.S. Cl. .......... 403/1; 192/72; 192/85.47; 192/89.2; 192/93 C; 403/31; 403/203

(58) Field of Classification Search .............. 403/1, 31, 403/203; 192/65, 66.21, 85.38, 85.47, 72, 192/85.04, 85.12, 93 C, 89.2; 279/2.11, 279/2.1, 2.03, 2.09

See application file for complete search history.

(56) References Cited

U.S. PATENT DOCUMENTS

| | | | |
|---|---|---|---|
| 3,861,815 A * | 1/1975 | Landaeus | ...................... 403/370 |
| 4,616,948 A | 10/1986 | Jelfs | |
| 4,859,106 A | 8/1989 | Elsner et al. | |
| 5,149,220 A | 9/1992 | Elsner et al. | |
| 5,156,480 A | 10/1992 | Elsner | |
| 5,407,046 A | 4/1995 | Kawasaki | |
| 5,562,358 A | 10/1996 | Okamoto et al. | |
| 5,876,041 A | 3/1999 | Kuckelsberg et al. | |

FOREIGN PATENT DOCUMENTS

| | | |
|---|---|---|
| DE | 3417430 | 11/1985 |
| DE | 3504047 | 8/1986 |

(Continued)

*Primary Examiner* — Rodney H Bonck
(74) *Attorney, Agent, or Firm* — Harness, Dickey & Pierce, P.L.C.

(57) ABSTRACT

A friction coupling for locking a shaft relative to a hub is disclosed. The friction coupling includes a radially deformable inner sleeve, a radially deformable outer sleeve, an annular piston which is axially movable relative to the inner sleeve and the outer sleeve, the annular piston having a conical surface, which cooperates with the inner sleeve and/or the outer sleeve and which is arranged to deform the inner sleeve and/or the outer sleeve when the annular piston is moved relative to the inner sleeve and the outer sleeve so as to provide the locking. In at least one embodiment, the friction coupling further includes at least one actuating device to produce a movement of the annular piston for locking the friction coupling, and at least one deactuating device to produce a movement of the annular piston for unlocking the friction coupling. The at least one actuating and deactuating devices are located, seen in the axial direction, on the same side of the annular piston.

12 Claims, 4 Drawing Sheets

FOREIGN PATENT DOCUMENTS

| | | | |
|---|---|---|---|
| DE | 3833350 | 4/1990 | |
| DE | 10307565 | 4/2004 | |
| EP | 0344761 | 12/1989 | |
| GB | 1208555 | 10/1970 | |
| JP | 5-209604 A * | 8/1993 | ......... 403/1 |
| JP | 5-248445 A * | 9/1993 | ......... 403/1 |
| JP | 09-032861 | 2/1997 | |
| SE | 9700237-2 | 7/1998 | |
| SE | 511085 | 8/1999 | |
| WO | WO 84/04367 | 11/1984 | |
| WO | WO 98/32563 | 7/1998 | |
| WO | WO 2004/007129 | 1/2004 | |
| WO | WO 2005/025790 | 3/2005 | |

* cited by examiner

FRICTION COUPLING

FIELD OF THE INVENTION

The invention relates to a friction coupling for locking a shaft relative to a hub.

BACKGROUND ART

U.S. Pat. No. 4,616,948, the entire disclosure of which is incorporated herein by reference, discloses a friction coupling for locking a shaft relative to a hub. The friction coupling comprises a radially deformable inner sleeve and a radially deformable outer sleeve, and an annular piston which is axially movable relative to the inner sleeve and the outer sleeve. The annular piston has a conical surface, which cooperates with the outer sleeve and which is arranged to deform the inner sleeve and/or the outer sleeve when the annular piston is moved relative to the inner sleeve and the outer sleeve, thus applying a contact force between, on the one hand, the inner sleeve and the shaft and, on the other hand, the outer sleeve and the hub. The contact force produces a frictional force, which causes the shaft and the hub to be locked relative to each other. The friction coupling further comprises an actuating pressure chamber, which when pressurised produces a movement of the annular piston for locking the coupling, and a deactuating pressure chamber, which when pressurised produces a movement of the annular piston for unlocking the coupling. The actuating pressure chamber and the deactuating pressure chamber are located, seen in the axial direction, on opposite sides of the annular piston.

Other examples of friction couplings of similar type are known from U.S. Pat. No. 4,859,106, U.S. Pat. No. 5,149,220 and U.S. Pat. No. 5,156,480, the entire disclosure of which is incorporated herein by reference.

A drawback of the above-mentioned friction coupling is that if connecting means for feeding of compressed fluid to the actuating pressure chamber and the deactuating pressure chamber are to be arranged on the same side of the coupling, seen in the axial direction, a duct has to be provided through the inner sleeve or the outer sleeve, which makes it difficult to reduce the radial extension of the friction coupling, thus making the friction coupling radially unwieldy, and also increasing its weight.

Another drawback is that the presence of the duct causes problems of strength, which have to be compensated for by an increase of the material thickness of the coupling or by load limits on the coupling.

Yet another drawback is that the above-mentioned friction coupling requires relatively heavy forces for actuation or deactuation. Since the piston surface facing the actuating pressure chamber and the deactuating pressure chamber is relatively small, a very high pressure is required, for instance, often a pressure of up to 1000 bar for assembling and of up to 1200 bar for disassembling. This puts great demands on the equipment needed for actuation and deactuation, which results in higher costs of the equipment.

SUMMARY OF THE INVENTION

One object is to provide an improved or alternative friction coupling. A specific object is to provide a friction coupling which is less unwieldy in the radial direction. A further object is to provide a friction coupling having a lower weight. Yet another object is to provide a friction coupling which enables the use of less expensive equipment for actuation and deactuation.

The above objects are wholly or partly achieved by a friction coupling according to the independent claim. Embodiments will be evident from the dependent claims, from the following description and the accompanying drawings.

Thus, a friction coupling is provided for locking a shaft relative to a hub. The friction coupling comprises a radially deformable inner sleeve, which is arranged for frictional engagement with the shaft, a radially deformable outer sleeve, which is arranged for frictional engagement with the hub, and an annular piston, which is axially movable relative to the inner sleeve and the outer sleeve. The annular piston has a conical surface, which cooperates with the inner sleeve and/or the outer sleeve and which is arranged to deform the inner sleeve and/or the outer sleeve when the annular piston is moved relative to the inner sleeve and the outer sleeve, so as to provide said locking. The friction coupling further comprises actuating means arranged to produce a movement of the annular piston for locking the friction coupling, and deactuating means arranged to produce a movement of the annular piston for unlocking the friction coupling. The actuating means and the deactuating means are located, seen in the axial direction, on the same side of the annular piston.

"Shaft" and "hub" are schematic designations. By "hub" is here meant any machine element. By "shaft" is correspondingly meant a machine element of any cross-section, which in its non-locked state can perform an axial and/or rotary movement relative to the hub.

By arranging the actuating and the deactuating means on the same side, or at the same end, of the piston, it is no longer necessary to provide a connection through the inner sleeve or the outer sleeve for controlling an actuating or deactuating means provided at the other side of the piston, whereby a thinner, lighter and/or stronger coupling can be obtained.

By arranging the actuating and the deactuating means on the same side of the piston, their dimensions are not limited by the size of the piston, which makes it possible to adjust the surfaces absorbing the forces which are to be transferred to the piston.

The deactuating means can comprise a deactuating pressure chamber, which when pressurised produces said movement of the annular piston for unlocking the friction coupling.

Furthermore, the actuating means can comprise an actuating pressure chamber, which when pressurised produces said movement of the annular piston for locking the friction coupling.

By "pressure chamber" is meant a space which when pressurised affects the activation of the friction coupling.

By arranging the pressure chambers on the same side, or at the same end, of the piston, it is in particular unnecessary to provide a duct for compressed fluid through the inner sleeve or the outer sleeve, whereby a thinner, lighter and/or stronger coupling can be obtained. The friction coupling can further comprise a flange, which is joined to the annular piston and which separates said actuating pressure chamber from said deactuating pressure chamber. The extension of the flange in the radial direction from the shaft can be selected so that it obtains assembling and disassembling surfaces of suitable dimensions. Tests performed by the applicant have shown that a reduction from about 1000 bar to about 350 bar can be made possible by an appropriate selection of the dimensions of the assembling and disassembling surfaces.

According to one embodiment, the flange can be integrated with the annular piston. The flange can, for instance, be formed integrally with the annular piston.

The flange can have an assembling surface, which defines the actuating pressure chamber, and a disassembling surface, which defines the deactuating pressure chamber. The assembling surface and the disassembling surface both have a radial extension from the shaft, and can coincide with the extension of the flange in the same direction.

According to one embodiment, the disassembling surface is greater than the assembling surface, which results in a greater disassembling force than assembling force at the same pressure and which makes it possible to perform the disassembling operation at a lower pressure.

The assembling surface can have a greater area than a first cross-sectional area of the piston, which first cross-sectional area is located at a first end of a piston portion active against the inner sleeve and the outer sleeve, and is oriented in the same axial direction as the assembling surface.

This makes it possible to perform the assembling operation at a considerably lower pressure than in prior art.

The disassembling surface can have a greater area than a second cross-sectional area of the piston, which second cross-sectional area is located at a second end of a piston portion active against the inner sleeve and the outer sleeve, and is oriented in the same axial direction as the disassembling surface.

This makes it possible to perform the disassembling operation at a considerably lower pressure than in prior art.

Alternatively, the actuating means can comprise an elastically compressible actuating means, which is arranged to produce said movement of the annular piston for locking the friction coupling. Thus a self-locking coupling can be obtained.

According to one embodiment, at least one of the inner sleeve and the outer sleeve can have a slot extending in said axial direction. By such slots, the force needed to produce the compression/expansion of the inner and/or the outer sleeve can be reduced.

A friction modified surface can be provided on at least one of a surface of the annular piston cooperating with the inner sleeve, a surface of the annular piston cooperating with the outer sleeve, a surface of the outer sleeve cooperating with the piston and a surface of the inner sleeve cooperating with the piston.

A lubricating duct can be arranged on at least one of a surface of the annular piston cooperating with the inner sleeve, a surface of the annular piston cooperating with the outer sleeve, a surface of the outer sleeve cooperating with the piston and a surface of the inner sleeve cooperating with the piston.

The conical surface can consist of a contact surface between the inner sleeve and the annular piston.

Alternatively, or as a complement, the conical surface can consist of a contact surface between the outer sleeve and the annular piston.

Examples of embodiments will be described in more detail below with reference to the accompanying drawings.

DESCRIPTION OF EMBODIMENTS

Figure 1:
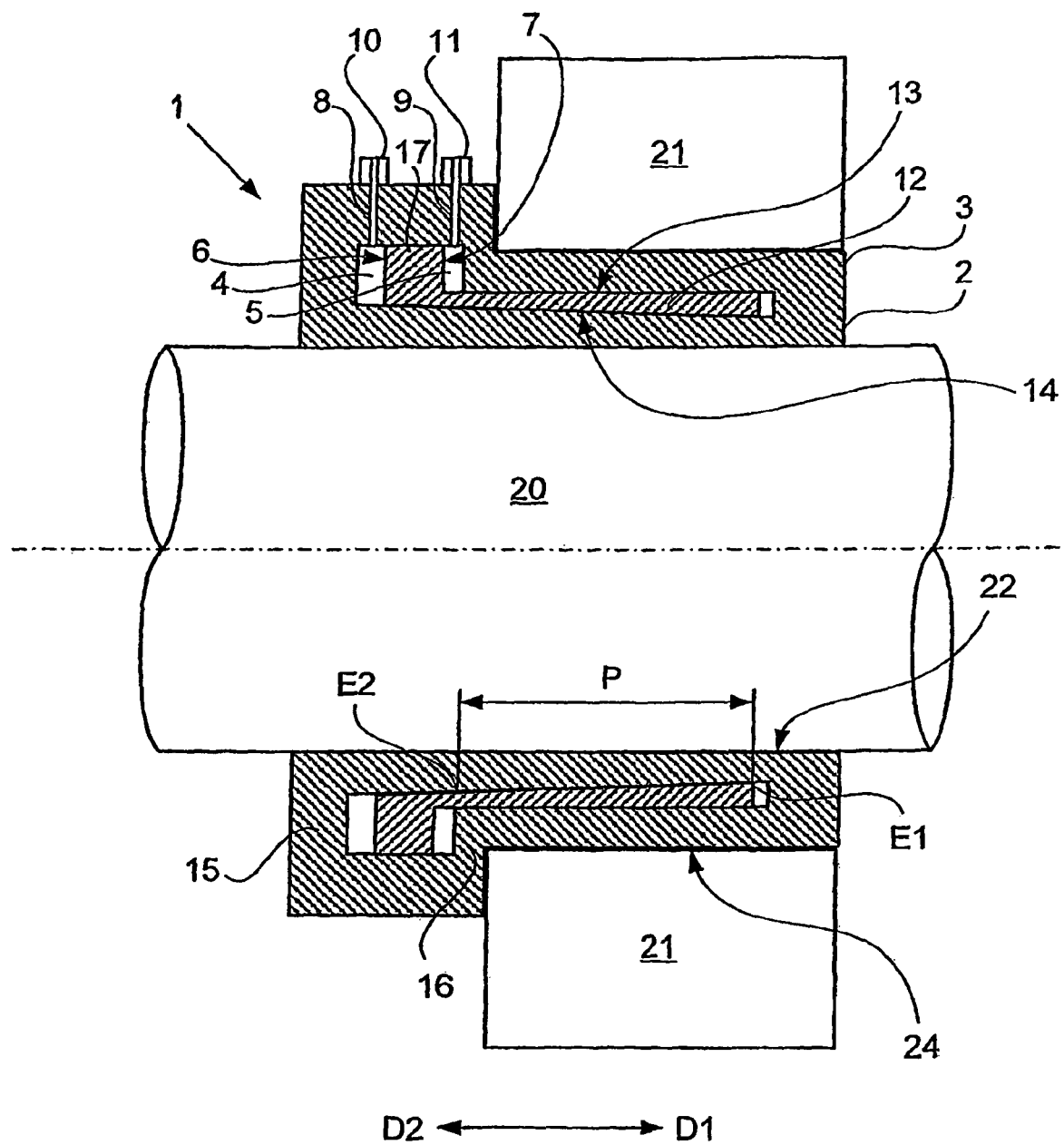
FIG. 1 is a schematic sectional view of an embodiment of a friction coupling.

FIG. 1 is a schematic sectional view of an embodiment of a friction coupling 1, which is arranged to connect a shaft 20 to a hub 21. The friction coupling 1 comprises an inner sleeve 2, which has a shaft contact surface 22 and a piston contact surface 14; and an outer sleeve 3, which has a hub contact surface 24 and a piston contact surface 13. An axially movable annular piston 12 is arranged between the inner sleeve 2 and the outer sleeve 3.

The material thicknesses shown in FIG. 1 are only schematic. The thickness of the inner sleeve 2, the outer sleeve 3 and the piston 12 can be dimensioned according to the application in which the friction coupling is to be used.

According to the embodiment shown in FIG. 1, the contact surface 14 between the inner sleeve 2 and the piston 12 is a conical surface, so that a movement of the piston 12 in the direction D2 (to the left in FIG. 1) causes an expansion of the outer sleeve 3 and a compression of the inner sleeve 2. To elucidate the description, the conical surface shown in FIG. 1 has a considerably greater conical angle than in a real application. For details concerning the selection of the conical shape of the conical surface, reference is made to the above-mentioned U.S. Pat. No. 4,616,948.

The piston 12 has a flange 17, which projects radially from one end of the piston 12 and which has an assembling surface 7 and a disassembling surface 6 located on an opposite side of the flange 17. The assembling surface 7 is part of a boundary surface of an actuating pressure chamber 5. A radially projecting part 16 of the outer sleeve 3 forms yet another delimiting part of the actuating pressure chamber 5. Also a portion of the piston forms a boundary surface of the actuating pressure chamber 5. The disassembling surface 6 is part of a boundary surface of a deactuating pressure chamber 4. A radially projecting part 15 of the inner sleeve 2 forms yet another delimiting part of the deactuating pressure chamber 4. Also a portion of the outer sleeve located at the flange forms a boundary surface of the deactuating pressure chamber 4.

Connecting means 10, 11 for compressed fluid communicate via ducts 8, 9 with the actuating pressure chamber 5 and the deactuating pressure chamber 4, respectively.

In FIG. 1, the designation P indicates the piston portion active against both the outer sleeve 3 and the inner sleeve 2, i.e. the piston portion engaged in the power transmission between the shaft and the hub. The designations E1 and E2 indicate the respective ends of the portion P.

The description will now be aimed at the function of the friction coupling 1.

The friction coupling 1 is arranged with normal machine tolerance requirements between the shaft 20 and the hub 21, so as to obtain some play (not shown) between the friction coupling 1 and, respectively, the shaft 20 and the hub 21.

By pressurising the actuating pressure chamber 5, a force is applied to the assembling surface 7, which causes the annular piston 12 to move in the direction D2 (to the left in FIG. 1), whereby cooperation at the contact surface 14 of the piston 12 and the inner sleeve 2 causes the compression of the inner sleeve 2 and thus produces a contact pressure in the contact surface 22 between the inner sleeve 2 and the shaft 20. The deactuating pressure chamber 4 can optionally be drained or unloaded in some other way when pressurising the actuating pressure chamber 5.

Simultaneously, cooperation at the contact surface 13 of the piston 12 and the outer sleeve 3 causes the expansion of the outer sleeve 3, thus producing a contact pressure in the contact surface 24 between the outer sleeve and the hub 21.

The contact pressures in the contact surfaces 22, 24, together with the friction in the contact surfaces, connect the shaft 20 to the hub 21, so that any relative movement between them is counteracted or prevented. The coupling is thus in an assembled state.

By instead pressurising the deactuating pressure chamber 4, a force is applied to the disassembling surface 6, which causes the annular piston 12 to move in the direction D1 (to the right in FIG. 1), whereby the pressure in the contact surfaces 13, 14 between the piston 12 and the outer sleeve 3 and the inner sleeve 2, respectively, is unloaded, and thus also the pressure in the contact surfaces 22, 24 between the inner sleeve 2 and the shaft 20 and between the outer sleeve 3 and the hub 21 is unloaded, so that a relative movement between the shaft 20 and the hub 21 is made possible.

One or both contact surfaces 13, 14 between the piston 12 and, respectively, the outer sleeve 3 and the inner sleeve 2 can have a modified friction coefficient. The aim of such a modification may be to obtain a low and even friction coefficient and/or to obtain a difference which is as small as possible between the static and the dynamic friction coefficients of the contact surfaces 13, 14.

As a non-limiting example of a friction-reducing coating, mention can be made of a surface coating of so-called chemical nickel.

Figure 2:
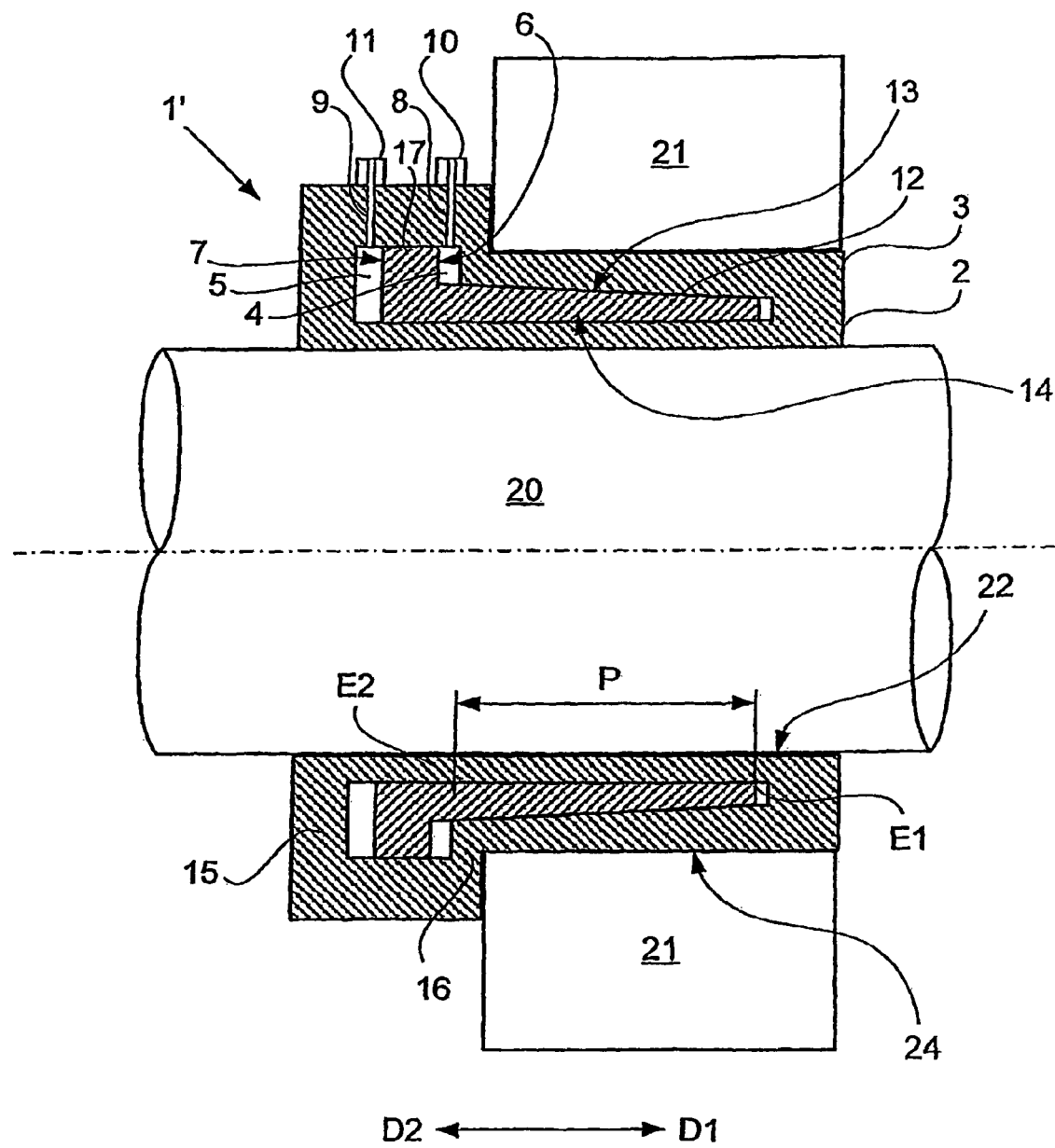
FIG. 2 is a schematic sectional view of an alternative embodiment of a friction coupling (1').

According to an alternative embodiment of a friction coupling 1', which is shown in FIG. 2, the contact surface 14 between the outer sleeve 3 and the piston 12 is instead a conical surface.

Thus, in the embodiment shown in FIG. 2, the actuating pressure chamber 5 and the deactuating pressure chamber 4, on the one hand, and the assembling surface 7 and the disassembling surface 6, on the other hand, are reversed, the conical surface tapering instead in the direction D1, so that the actuation or assembling is achieved by the left pressure chamber (reference numeral 5 in FIG. 2) being pressurised, and the deactuation or disassembling is achieved by the right pressure chamber (reference numeral 4 in FIG. 2) being pressurised. This embodiment results in the assembling surface 7 being greater than the disassembling surface 6.

According to another alternative embodiment (not shown), the contact surface 14 between the inner sleeve 2 and the piston 12, and the contact surface 13 between the outer sleeve and the piston 12 are both conical surfaces.

According to yet another embodiment, one or both of the contact surfaces 13, 14 are provided with lubricating ducts, such as those disclosed in U.S. Pat. No. 4,616,948.

The pressurisation of the actuating and the deactuating pressure chambers 5, 4, respectively, can be obtained by connecting a hydraulic pump. As an alternative, movable pistons (not shown) arranged in flanges in the inner sleeve 2 and/or the outer sleeve 3 may be used to obtain the pressurisation of the respective pressure chambers 4, 5.

Figure 3:
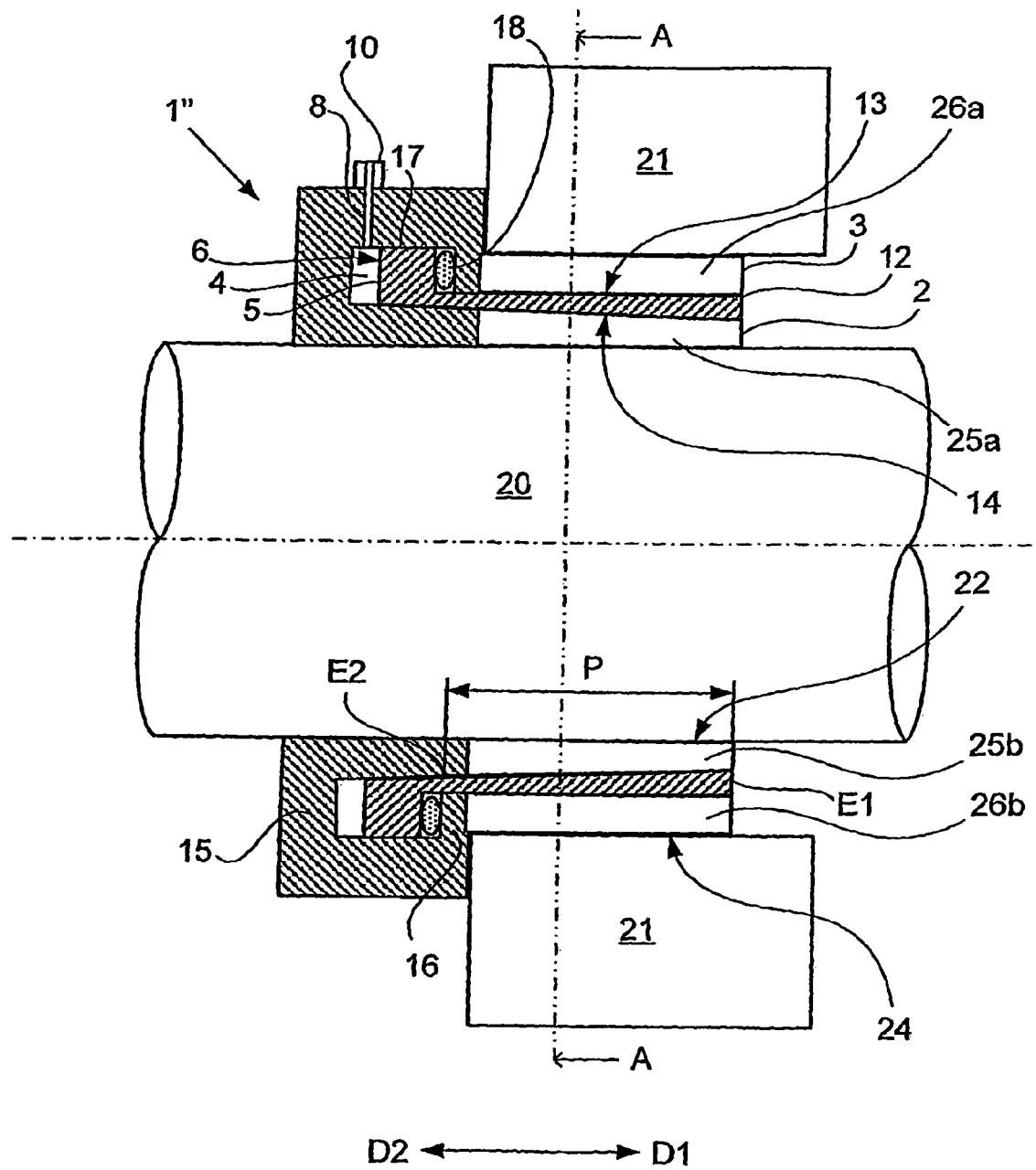
FIG. 3 is a schematic sectional view of yet another alternative embodiment of a friction coupling (1").
Figure 4:
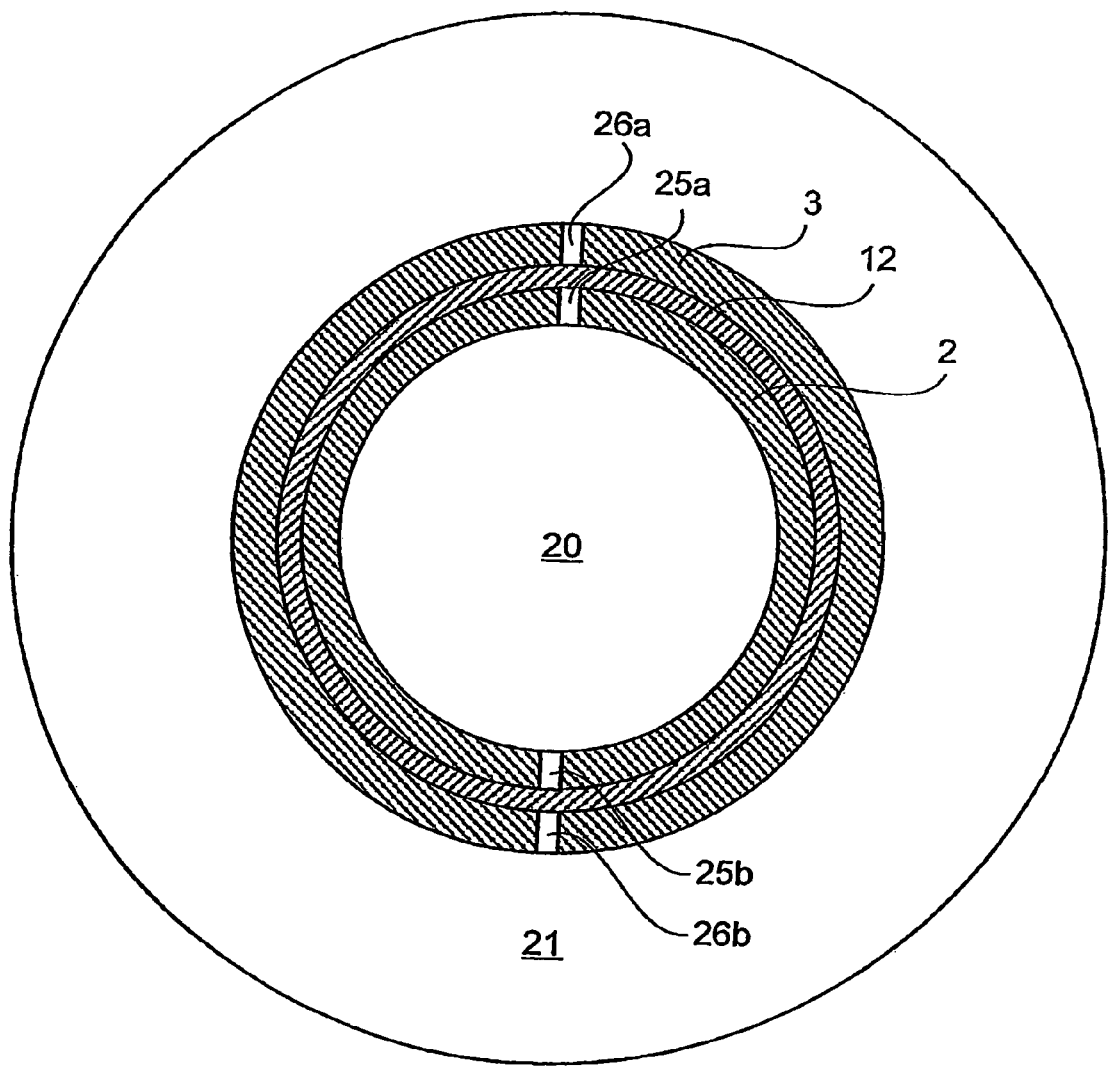
FIG. 4 is a sectional view along the line A-A in FIG. 3.

In the embodiment of a friction coupling 1" shown in FIGS. 3 and 4, the actuating pressure chamber (reference numeral 5 in FIG. 1 and FIG. 2) is replaced with an elastically resilient actuating means 18, which is arranged to bias the piston in the direction D2, i.e. to provide the locking of the friction coupling 1" without the use of a hydraulic pump.

The actuating means 18 can be a spring means, such as a cup spring, a helical spring, a gas spring, a compressible material or the like.

The deactuating pressure chamber 4 described with reference to FIG. 1 is still the same and works exactly as described in connection with FIG. 1, i.e. when the deactuating pressure chamber 4 is pressurised a movement of the piston is produced in the direction D1, which unlocks the coupling 1".

FIG. 3 also illustrates how the outer sleeve 3 and the inner sleeve 2 are each provided with longitudinal slots 25a, 25b; 26a, 26b facilitating the expansion/contraction of the sleeves which arises when the piston 12 is moved and the coupling 1" is locked, thus reducing the force needed to lock/unlock the coupling 1". The slots are arranged in the part of the inner sleeve 2 and/or the outer sleeve 3 that cooperates with the piston 12 and extend in the radial direction through the entirety of the inner sleeve 2 and the outer sleeve 3, respectively.

According to an alternative embodiment, only the inner sleeve 2 is provided with one or more slots 25a, 25b. According to a further alternative embodiment, the inner sleeve is provided with only one slot 25a or 25b.

According to another alternative embodiment, only the outer sleeve 3 is provided with one or more slots 26a, 26b. According to a further alternative embodiment, the outer sleeve is provided with only one slot 26a or 26b.

According to yet another alternative embodiment, also the piston, in conformity with the above-described slotted inner and/or outer sleeves, is provided with one or more slots (not shown).

The above-described slots 25a, 25b, 26a, 26b are particularly suitable for use together with an elastically resilient actuating means 18, which is not capable of exerting a force as great as, for instance, that of the actuating pressure chamber 5 described with reference to FIG. 1.

According to further alternative embodiments, also the inner and/or outer sleeves 2, 3 in the couplings 1, 1' described with reference to FIG. 1 and FIG. 2 can be provided with one or more such slots.

Furthermore, the gap between the inner sleeve 2 and the outer sleeve 3 where the piston 12 is positioned can be wholly or partly uncovered in the direction D1, which makes it possible to limit the axial extension of the coupling 1, 1', 1", thus contributing to making the coupling more compact in the axial direction.

In a corresponding manner, the embodiment shown in FIG. 2 can be modified (not shown) in accordance with that shown in FIGS. 3 and 4, the actuating pressure chamber 5 being replaceable with an elastically resilient actuating means.

The one skilled in the art will realise that, in FIG. 1 or 2, it would instead be possible to replace the deactuating pressure chamber 4 with an elastically resilient deactuating means (corresponding to the elastically resilient actuating means 18), thus obtaining a self-unlocking coupling (not shown).

The flange 17 can be integrated with the piston 12. According to one embodiment, the flange and the piston are formed in one piece of material, and in another embodiment they are formed of separate pieces of material which are subsequently joined together, for instance, by a threaded coupling or by a weld joint.

The inner sleeve and the outer sleeve can be joined together, for instance, by means of bolts or weld joints. A plurality of gaskets can be arranged in a manner known per se to prevent leakage.

The invention claimed is:

1. A friction coupling for locking a shaft relative to a hub, comprising:
 a radially deformable inner sleeve, arranged for frictional engagement with the shaft;
 a radially deformable outer sleeve, arranged for frictional engagement with the hub;
 an annular piston, axially movable relative to the inner sleeve and the outer sleeve, the annular piston having a conical surface to cooperate with at least one of the inner sleeve and the outer sleeve and to deform at least one of the inner sleeve and the outer sleeve when the annular piston is moved relative to the inner sleeve and the outer sleeve, so as to provide said locking;

at least one actuating device, arranged to produce a movement of the annular piston for locking the friction coupling; and at least one deactuating device, arranged to produce a movement of the annular piston for unlocking the friction coupling, said at least one actuating device and said at least one deactuating device being located, seen in the axial direction, on a same side of the annular piston.

2. A friction coupling as claimed in claim 1, wherein said at least one deactuating device comprises a deactuating pressure chamber, which when pressurised produces said movement of the annular piston for unlocking the friction coupling.

3. A friction coupling as claimed in claim 2, wherein said at least one actuating device comprises an elastically compressible actuating device, arranged to produce said movement of the annular piston for locking the friction coupling.

4. A friction coupling as claimed in claim 2, wherein said at least one actuating device comprises an actuating pressure chamber, which when pressurised produces said movement of the annular piston for locking the friction coupling.

5. A friction coupling as claimed in claim 4, further comprising a flange, joined to the annular piston, to separate said actuating pressure chamber from said deactuating pressure chamber.

6. A friction coupling as claimed in claim 5, wherein the flange includes an assembling surface, which defines the actuating pressure chamber, and a disassembling surface, which defines the deactuating pressure chamber, and wherein the disassembling surface is greater than the assembling surface.

7. A friction coupling as claimed in claim 1, wherein said at least one actuating device comprises an elastically compressible actuating device, arranged to produce said movement of the annular piston for locking the friction coupling.

8. A friction coupling as claimed in claim 1, wherein at least one of the inner sleeve and the outer sleeve includes a slot extending in said axial direction.

9. A friction coupling as claimed in claim 1, wherein a friction modified surface is provided on at least one of a surface of the annular piston cooperating with the inner sleeve, a surface of the annular piston cooperating with the outer sleeve, a surface of the outer sleeve cooperating with the piston and a surface of the inner sleeve cooperating with the piston.

10. A friction coupling as claimed in claim 1, wherein a lubricating duct is arranged on at least one of a surface of the annular piston cooperating with the inner sleeve, a surface of the annular piston cooperating with the outer sleeve, a surface of the outer sleeve cooperating with the piston and a surface of the inner sleeve cooperating with the piston.

11. A friction coupling as claimed in claim 1, wherein said conical surface includes at least one of
a contact surface between the inner sleeve and the annular piston, and
a contact surface between the outer sleeve and the annular piston.

12. A friction coupling as claimed in claim 1, wherein said at least one actuating device comprises an actuating pressure chamber, which when pressurised produces said movement of the annular piston for locking the friction coupling.

* * * * *